Patented Jan. 5, 1932

1,839,288

UNITED STATES PATENT OFFICE

ROBERT WOTHERSPOON, OF BROOKLYN, NEW YORK, ASSIGNOR TO ORBIS PRODUCTS TRADING CO., INC., OF NEW YORK, N. Y., A CORPORATION OF NEW YORK

PROCESS FOR THE PRODUCTION OF THYMOL AND MENTHONE

No Drawing.   Application filed December 5, 1928.   Serial No. 324,070.

My invention relates to the production of thymol and menthone and refers particularly to their production from hydrogenated thymolic ketones such as menthenone and piperitone.

The production of menthone from the ketones, menthenone and piperitone, has been suggested by treating a ketone with an excess of hydrogen in the presence of nickel under pressure in an autoclave, the underlying principle being that the added hydrogen will supply the two atoms of hydrogen necessary to convert a molecule of menthenone, or piperitone, to one molecule of menthone. The practical application of this process has not resulted in large percentage yields.

As there are but two less atoms of hydrogen in a molecule of thymol than there are in menthenone, or piperitone the above described process for the production of menthone converts these ketones into menthone without the formation of thymol, or with the production of inconsiderable accidental amounts of the latter.

I have found that when two molecules of either menthone, or piperitone are heated with reduced nickel without the presence of added hydrogen, that is, in the absence of extraneous reactive hydrogen, a dehydrogenation of two atoms of hydrogen occurs, forming thymol; the two atoms of hydrogen combining with a molecule of menthenone forming menthone.

These reactions may be represented as follows:—

Menthenone+Ni=thymol+2H
Menthenone+2H=menthone

It is seen from the above that according to this theoretical reaction two molecules of menthenone will produce one molecule of thymol and one molecule of menthone.

I have found, therefore, that hydrogenated thymolic ketones having the empirical formula $C_9H_{16}.CO$ such as menthenone and piperitone can be heated with a catalyst or dehydrogenating material, such as reduced nickel, to produce thymol and menthone if said reaction takes place in the ordinary atmosphere, under pressure, under reduced pressure or in vacuum without the addition of extra hydrogen, that is, in the absence of extraneous reactive hydrogen.

As one example of the process of my invention, I give the following:—

One hundred parts piperitone are placed in a retort equipped with a reflux condenser and a suitable heating arrangement whereby the ketone is heated to the boiling point which is approximately 230° C. Five parts of reduced nickel are then added and the mixture heated to the boiling point for two hours. The bulk of the reaction is then separated from the catalyst by filtration and treated with sufficient caustic soda solution to dissolve the thymol from the menthone. Upon the addition of dilute sulphuric acid to the soda solution of thymol, a separation of crude thymol results which can be crystallized to produce a pure product. The products of this example are approximately 50% thymol and 50% menthone, which agrees with the formulæ above-mentioned.

It will be noted that according to the suggested theory as to the reactions taking place during the process, all of the hydrogen evolved by the dehydrogenation of the menthenone reacts upon a further quantity of menthenone to produce menthone and that, therefore, there is no evolved hydrogen present to convert menthenone or menthone into menthol.

I do not confine myself to the above stated theory which is given simply as my theoretical explanation of the facts obtained in actual practice of my process.

I do not limit myself to the particular times, temperatures, quantities, materials, or steps, of process particularly described, as these are given simply as a means for clearly explaining the process of my invention.

What I claim is:—

1. In a process for the treatment of hydrogenated thymolic ketones, the step which comprises heating a hydrogenated thymolic ketone having the empirical formula $C_9H_{16}.CO$ with reduced nickel at approximately the boiling point of the mixture in the absence of extraneous reactive hydrogen producing thymol and menthone.

2. In a process for the treatment of hydrogenated thymolic ketones the step which comprises heating piperitone with reduced nickel at approximately the boiling point of the mixture in the absence of extraneous reactive hydrogen producing thymol and menthone.

3. In a process for the treatment of hydrogenated thymolic ketones, the step which comprises heating a hydrogenated thymolic ketone having the empirical formula $C_9H_{16}.CO$ with reduced nickel at approximately the boiling point of the mixture at atmospheric pressure in the absence of extraneous reactive hydrogen producing thymol and menthone.

4. In a process for the treatment of hydrogenated thymolic ketones, the step which comprises heating piperitone with reduced nickel at approximately the boiling point of the mixture in the absence of extraneous reactive hydrogen producing thymol and menthone.

Signed at Brooklyn in the county of Kings and State of New York this 1st day of December, 1928.

ROBERT WOTHERSPOON.